United States Patent
Spross

(10) Patent No.: US 9,874,432 B2
(45) Date of Patent: Jan. 23, 2018

(54) OPTICAL PRESSURE SENSOR

(75) Inventor: Ronald L. Spross, Humble, TX (US)

(73) Assignee: Halliburton Energy Services, Inc, Houston, TX (US)

( * ) Notice: Subject to any disclaimer, the term of this patent is extended or adjusted under 35 U.S.C. 154(b) by 98 days.

(21) Appl. No.: 13/812,040

(22) PCT Filed: Aug. 19, 2010

(86) PCT No.: PCT/US2010/002272
§ 371 (c)(1),
(2), (4) Date: Jan. 24, 2013

(87) PCT Pub. No.: WO2012/023918
PCT Pub. Date: Feb. 23, 2012

(65) Prior Publication Data
US 2013/0120756 A1 May 16, 2013

(51) Int. Cl.
*G01B 9/02* (2006.01)
*G01L 11/02* (2006.01)

(52) U.S. Cl.
CPC ............... *G01B 9/02* (2013.01); *G01L 11/02* (2013.01)

(58) Field of Classification Search
CPC ...................................................... G01B 9/02
USPC ........................................................ 356/483
See application file for complete search history.

(56) References Cited

U.S. PATENT DOCUMENTS

| | | | |
|---|---|---|---|
| 4,752,132 A | 6/1988 | Pavlath | |
| 4,799,752 A * | 1/1989 | Carome | ........................ 385/12 |
| 4,853,534 A | 8/1989 | Dakin | |
| 4,885,462 A | 12/1989 | Dakin | |
| 4,888,480 A | 12/1989 | Dakin | |
| 4,897,542 A | 1/1990 | Dakin et al. | |
| 4,898,468 A | 2/1990 | Udd | |
| 5,046,848 A | 9/1991 | Udd | |
| 5,218,418 A | 6/1993 | Layton | |
| 5,218,419 A | 6/1993 | Lipson et al. | |
| 5,315,110 A | 5/1994 | Smith | |
| 5,636,021 A | 6/1997 | Udd | |
| 6,166,815 A * | 12/2000 | Vali | ................... G01B 9/02007 356/477 |

(Continued)

FOREIGN PATENT DOCUMENTS

AU 2010359357 B2 6/2014
GB 2145514 A 3/1985

(Continued)

OTHER PUBLICATIONS

"Australian Application Serial No. 2010359357, Office Action dated Mar. 12, 2013", 2 pgs.

(Continued)

*Primary Examiner* — Tarifur Chowdhury
*Assistant Examiner* — Omar Nixon
(74) *Attorney, Agent, or Firm* — Haynes & Boone, LLP

(57) ABSTRACT

Various embodiments include apparatus and methods of measuring pressure within pipes implemented in a well drilling operation. Methods and apparatus may include a single path optical interferometer having a sensing portion attachable to a location on a conduit and a dual path optical interferometer having a sensing portion attachable to the conduit, where the sensing portions are effectively collocated. Additional apparatus, systems, and methods are disclosed.

21 Claims, 10 Drawing Sheets

(56) References Cited

U.S. PATENT DOCUMENTS

| | | | |
|---|---|---|---|
| 6,450,037 | B1 | 9/2002 | McGuinn et al. |
| 6,490,045 | B1 | 12/2002 | Dakin et al. |
| 6,550,342 | B2 | 4/2003 | Croteau et al. |
| 6,621,947 | B1 | 9/2003 | Tapanes et al. |
| 6,778,717 | B2 | 8/2004 | Tapanes et al. |
| 6,804,008 | B1 * | 10/2004 | Morison et al. ............. 356/479 |
| 6,868,737 | B2 | 3/2005 | Croteau et al. |
| 6,870,975 | B1 | 3/2005 | Morison et al. |
| 6,957,574 | B2 | 10/2005 | Ogle |
| 6,992,776 | B2 | 1/2006 | Feldchtein et al. |
| 7,261,002 | B1 * | 8/2007 | Gysling et al. ............ 73/861.42 |
| 7,511,823 | B2 | 3/2009 | Schultz et al. |
| 7,538,883 | B2 | 5/2009 | Froggatt |
| 2006/0072089 | A1 * | 4/2006 | Eussen ................ G03F 7/70858 355/53 |
| 2008/0204759 | A1 | 8/2008 | Choi |
| 2008/0291460 | A1 | 11/2008 | Khatchaturov et al. |
| 2009/0199630 | A1 | 8/2009 | DiFoggio et al. |
| 2009/0285520 | A1 * | 11/2009 | Kaplan .......................... 385/12 |
| 2010/0014095 | A1 | 1/2010 | Patel et al. |

FOREIGN PATENT DOCUMENTS

| | | | |
|---|---|---|---|
| WO | WO 2009091413 A1 * | 7/2009 | ............ E21B 47/18 |
| WO | WO-2012023918 A1 | 2/2012 | |

OTHER PUBLICATIONS

"Australian Application Serial No. 2010359357, Response filed Jan. 23, 2014 to Office Action dated Mar. 12, 2013", 11 pgs.

"Malaysian Application Serial No. PI2013000423, Preliminary Examination Report dated Mar. 29, 2013", 2 pgs.

"International Application Serial No. PCT/US2010/002272, Response filed Jun. 18, 2012 to Written Opinion dated Apr. 29, 2011", 6 pgs.

"Singaporean Application Ser. No. 201301011-1, Search Report dated Apr. 16, 2014", 7 pgs.

"European Application Serial No. 10752453.0, Response filed Jan. 20, 2015 to Examination Notification Art. 94(3) dated Oct. 7, 2014", 14 pgs.

"European Application Serial No. 10752453.0, Examination Notification Art. 94(3) dated Oct. 7, 2014", 5 pgs.

"European Application Serial No. 10752453.0, Examination Notification Art. 94(3) dated Mar. 18, 2015", 4 pgs.

"Gulf Cooperation Council Application Serial No. 2011/19077, First Examination Report dated Dec. 28, 2014", 3 pgs.

"Malaysian Application Serial No. PI 2013000423, Office Action dated Aug. 14, 2015", 3 pgs.

Zhang, Chengmei, et al., "A New Fiber-optic Microphone Based on Waveguide Modulator", Proceedings of SPIE, vol. 7508—2009 International Conference on Optical Instruments and Technology: Advanced Technologies and Applications, (2009), 750819-1-750819-8.

"International Application Serial No. PCT/US2010/002272, International Preliminary Report on Patentability dated Oct. 9, 2012", 6 pgs.

"International Application Serial No. PCT/US2010/002272, Search Report dated Apr. 29, 2011", 4 pgs.

"International Application Serial No. PCT/US2010/002272, Written Opinion dated Apr. 29, 2011", 5 pgs.

* cited by examiner

OPTICAL PRESSURE SENSOR

RELATED APPLICATIONS

This application is a U.S. National Stage Filing under 35 U.S.C. 371 from International Application No. PCT/US2010/002272, filed on 19 Aug. 2010, and published as WO 2012/023918 A1 on 23 Feb. 2012, which application and publication are incorporated herein by reference in their entirety.

TECHNICAL FIELD

The present invention relates generally to systems having capability of making measurements for well drilling operations.

BACKGROUND

In drilling wells for oil and gas exploration, understanding the structure and properties of the geological formation surrounding a borehole provides information to aid such exploration. However, the environment in which the drilling tools operate is at significant distances below the surface and measurements to manage operation of such equipment should be accurate and straight forward in operation. Further, the usefulness of such measurements may be related to the precision or quality of the information derived from such measurements.

DETAILED DESCRIPTION

The following detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

Figure 1:
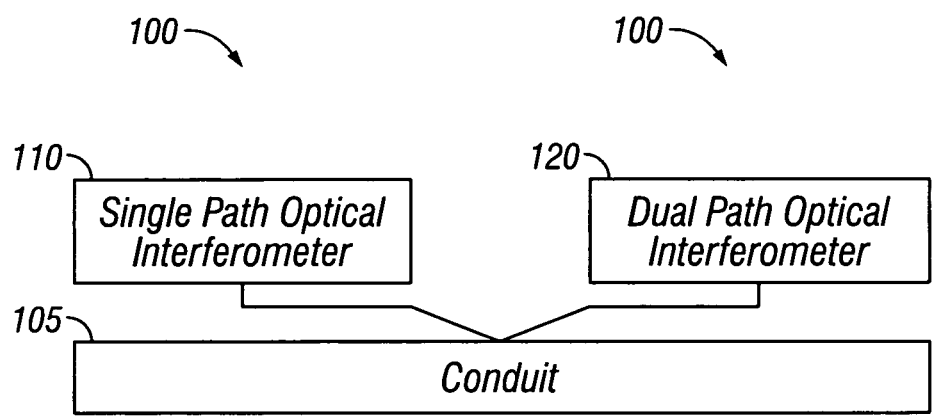
FIG. 1 shows a block diagram of an example embodiment of an apparatus to measure pressure in a conduit, according to various embodiments.

FIG. 1 shows a block diagram of an example embodiment of an apparatus 100 to measure pressure in a conduit 105. Apparatus 100 includes a single path optical interferometer 110 and a dual path optical interferometer 120. Conduit 105 is a workpiece on which apparatus 100 operates. Single path optical interferometer 110 has a sensing portion attachable to a location on conduit 105. In addition, dual path optical interferometer 120 has a sensing portion attachable to conduit 105 essentially at the location of the sensing portion of single path optical interferometer 110. Single path optical interferometer 110 and dual path optical interferometer 120 can be arranged together to measure pressure within the conduit. This arrangement provides a measuring tool to noninvasively determine pressure with a pressurized conduit 105. Pressurized conduit 105 may be a pressurized pipe of a well drilling operation in which fluid flows through the pressurized pipe. The pressure within the pressurized pipe due to this fluid may be correlated to the pressure downhole in the well drilling operation.

Single path optical interferometer 110 can include a Sagnac interferometer. A Sagnac interferometer generally is an arrangement in which a beam of light is split into two beams that follow a trajectory in opposite directions, where on return to the point of entry the two beams light combine in such a way that an interference pattern can be obtained, which can be related to different distances light travels with respect to the opposite directions of rotation. The different distance can be due to a change at a location in the propagation path, which is different at the different times that the path is subjected to the two opposite directions of propagation of the two beams. The Sagnac interferometer can be arranged as a fiber optic tool to measure a direction of pressure change within conduit 105. The Sagnac interferometer can include an optical source, while dual path optical interferometer 120 includes another optical source. The Sagnac interferometer can include an optical source, while dual path optical interferometer 120 includes the same optical source, that is the same optical source is common to both the Sagnac interferometer and dual path optical interferometer 120. The sensing portion of the Sagnac interferometer and the sensing portion of the dual path optical interferometer 120 can include the same sensing portion, that is, the same sensing portion is common to both the Sagnac interferometer and dual path optical interferometer 120. The common sensing portion can include an optical fiber wound around conduit 105.

Dual path optical interferometer 120 can include a Michelson interferometer. A Michelson interferometer generally is an arrangement in which a beam of light is split into two beams, using a beam splitter, that follow different paths, where the beams of light from each path are combined such that interference in the combination shows differences in the optical path length traveled by the two beams. With one of the two paths being a stable reference path, or reference arm, changes in the other optical path can be detected. In the Michelson interferometer, the ends to the two paths can include mirrors such that the two beams are reflected back to the same beamsplitter for recombination. The two paths may be set to the same length, where the Michelson interferometer indicates change or perturbation in the length of the non-reference path. The two paths may be set to different lengths, where this design difference is taken into account with respect to the recombined signal.

Dual path optical interferometer 120 can include a Mach-Zehnder interferometer. A Mach-Zehnder interferometer generally is an arrangement in which a beam of light is split into two beams, using a beam splitter, that follow different paths, where the beams of light from each path are combined such that inference in the combination reflects differences in the optical path length traveled by the two beams. With one of the two paths being a stable reference path, or reference arm, changes in the other optical path can be detected. In the Mach-Zehnder interferometer, the ends to the two paths are directed to an optical detector. The optical detector can include a second beam splitter for combining the optical output from the two different paths. The two paths may set to the same length, where the Mach-Zehnder interferometer indicates change or perturbation in the length of the non-reference path. The two paths may set to different lengths, where this design difference is taken into account with respect to the recombined signal.

The difference between the Michelson and Mach-Zehnder designs is in the output to an optical receiver. In the Michelson design, there are mirrors at the ends of the two paths reflecting the light back to the beam splitter from which the light from the optical source is first split. Whereas, in the Mach-Zehnder design, the two optical paths are joined at their far ends. For equal optical path lengths in the two approaches, the Michelson design can be twice as sensitive as the Mach-Zehnder design, because the light travels through the path twice in the Michelson interferometer as a result of the reflection off the mirrors. The Michelson interferometer and/or the Mach-Zehnder interferometer can be arranged as fiber optic tools to measure an amount of the pressure change within conduit 105.

In various embodiments, a fiber optic tool including a single path optical interferometer and a dual path optical interferometer can be used to measure pressure within a flow line pipe in a well drilling operation. In the well drilling operation, mud flows in this flow line pipe. Telemetry signals from the drilling tools down hole are encoded in pressure pulses which travel up the pipe. The pipe can undergo a small amount of mechanical deformation as the result of stress due to the pressure. The deformation of the pipe occurs circumferentially. With the sensing coils of the two systems of the fiber optic tool (or sensing coil if the two systems have a common sensing coil) configured as optical fibers wrapped around the pipe at a collocation on the pipe, as a pressure pulses propagate by this location, these sensing coils attached to the pipe will also undergo a mechanical deformation. The mechanical deformation of the sensing coils can either be tensive or compressive, depending upon on the pressure pulses, which can be negative or positive pulse signals.

The single path optical interferometer, such as a Sagnac interferometer, can be viewed as detecting the edges of the pulses. If the leading edge is increasing, a positive pulse outputs from the single path optical interferometer. If the edge is decreasing, a negative pulse can be output. The dual path optical interferometer provides a measure of change in length such that a measured distance is proportional to a specific amount of pressure change.

Such a fiber optic tool can provide a safe efficient operation as compared to current systems. Current systems use pressure sensors in which a hole is drilled into pipes of a drilling rig in order to place a pressure sensor in the pipes that may be pressurized at several thousand psi. In various embodiments, the sensing coils of the fiber optic pressure tool can be wrapped around the flow line pipe such that a hole is not drilled in the pipe. The length of these sensing coils can be a relatively small fraction of the total length of the optical fiber of the tool. For example, the sensing coil may have a length of about one percent or a fraction of one percent of the optical fiber of the tool. However, lengths of the sensing coil may be larger than one percent of the optical fiber of the tool. The fiber optic tool can be located at the surface of the well on the drilling rig somewhere between the point at which the drill string goes into the hole and where pumps that pump fluid into the well hole are located. This can provide about 100 to 200 feet of pipe on which to attach the sensing coils of the fiber optic tool. One or more sensors can be attached to the pipe in this length. However, one or more fiber optic pressure sensors can be placed at various locations on a pressurized pipe associated with the drilling rig.

Figure 2:
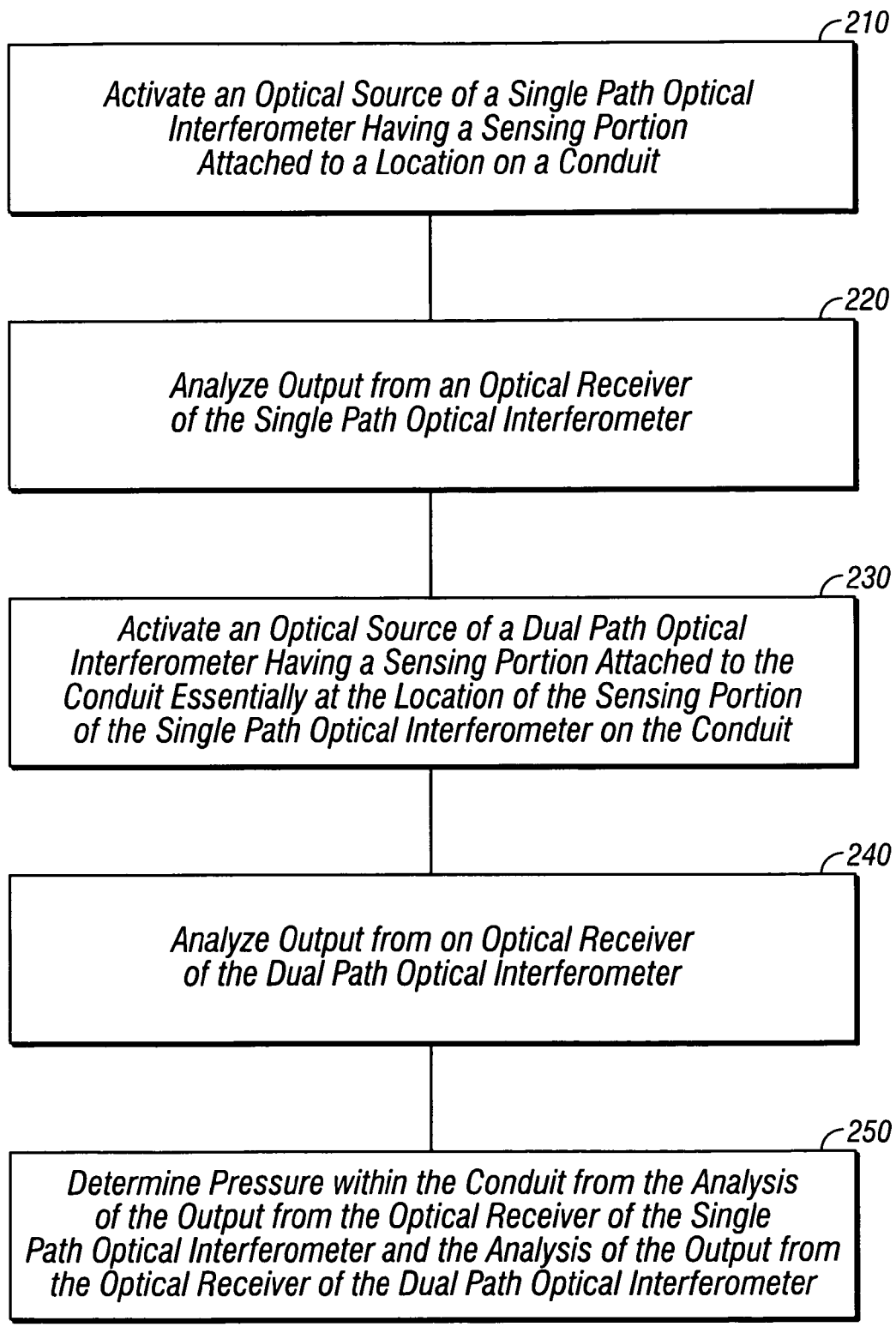
FIG. 2 shows features of an embodiment of a method of measuring pressure within a conduit, according to various embodiments.

FIG. 2 shows features of an embodiment of a method of measuring pressure within a conduit. At 210, an optical source of a single path optical interferometer having a sensing portion attached to a location on a conduit is activated. The conduit may be a pipe located at a surface location of a well drilling operation in which fluid of the drilling operation flows through the pipe.

At 220, output from an optical receiver of the single path optical interferometer is analyzed. This output is correlated to the light injected to the single path optical interferometer from activating the optical source of the single path optical interferometer. Analyzing output from the optical receiver of the single path optical interferometer can include measuring a rate of pressure change within the conduit. Such a measurement can include determining the direction of the pressure change, being the algebraic sign of the pressure change, from a Sagnac interferometer arranged as the single path optical interferometer.

At 230, an optical source of a dual path optical interferometer having a sensing portion attached to the conduit essentially at the location of the sensing portion of the single path optical interferometer on the conduit is activated. The optical source of the single path optical interferometer may be the same source as the optical source of the dual path optical interferometer. The sensing portion of the single path optical interferometer and the sensing portion of the dual path optical interferometer may be a common sensing portion. The common sensing portion can be an optical fiber having a number of turns wound around the conduit.

At 240, output from an optical receiver of the dual path optical interferometer is analyzed. This output is correlated to the light injected from activating the optical source of the dual path optical interferometer. Analyzing output from the optical receiver of the dual path optical interferometer can include counting signal oscillations in the output from an optical receiver of a Michelson interferometer arranged as the dual path optical interferometer or a Mach-Zehnder interferometer arranged as the dual path optical interferometer.

At 250, the pressure within the conduit is determined from the analysis of the output from the optical receiver of the single path optical interferometer and the analysis of the output from the optical receiver of the dual path optical interferometer. Determining pressure within the conduit may include mapping the count of the signal oscillations from the dual path optical interferometer to the magnitude of the pressure within the conduit using a strain relationship of the conduit.

In various embodiments, a combination of single path interferometer (for example, a Sagnac interferometer) and a dual path interferometer (for example, a Michelson interferometer and/or Mach-Zehnder interferometer) can be used as a tool to noninvasively determine pressure within a pressurized pipe. The pressurized pipe may be a flow line pipe in a drilling rig. Increments in the pressure can be determined by counting fringes (oscillations) or partial fringes produced using the dual path interferometer, and the direction of the increments (increasing or decreasing) can be determined by the single path interferometer installed at the same location. Signals from the single path interferometer, realized as a Sagnac interferometer, may be numerically integrated to provide a short term qualitative indication of pressure. The combined system can be calibrated using two or more independent pressure measurements other than from the interferometers of the tool. In an embodiment, rather than an output of the sensor being expressed as a pressure, it may include a signal that is proportional to the time derivative of the pressure. Pressure within the pressurized pipe can also be computed using the material properties of the pipe material and well known stress/strain relationships for the geometry of the pipe.

A fiber optic Sagnac sensor can be implemented to determine the existence of pressure changes within a pipe through detecting the associated changes in the circumference of the pipe due to the pressure within the pipe. The raw output from such a measurement is proportional to the rate of change of the circumference of the pipe (and the rate of change of the pressure within the pipe). A relatively sensitive determination of the circumference of the pipe can be made using a fiber optic Michelson sensor or a fiber optic Mach-Zehnder sensor as a mechanism to monitor pressure related changes in pipe circumference. In these Michelson and Mach-Zehnder methods, a split light beam travels through two equal length paths, of which one is stable and constitutes a reference, and the other of which is arranged to be sensitive to the pipe circumference, for example, the fiber corresponding to this path can be wrapped around the pipe. Combining the fiber optic Michelson and/or Mach-Zehnder sensor with the fiber optic Sagnac sensor allows pressure determination without inference of the pressure using the fiber optic Sagnac sensor based on calibration of the Sagnac sensor to an independent measure of the pressure followed by a long term integration of the signal, where the error in the computed pressure of such an arrangement (without the Michelson or Mach-Zehnder sensors) may increase with time.

Figure 3:
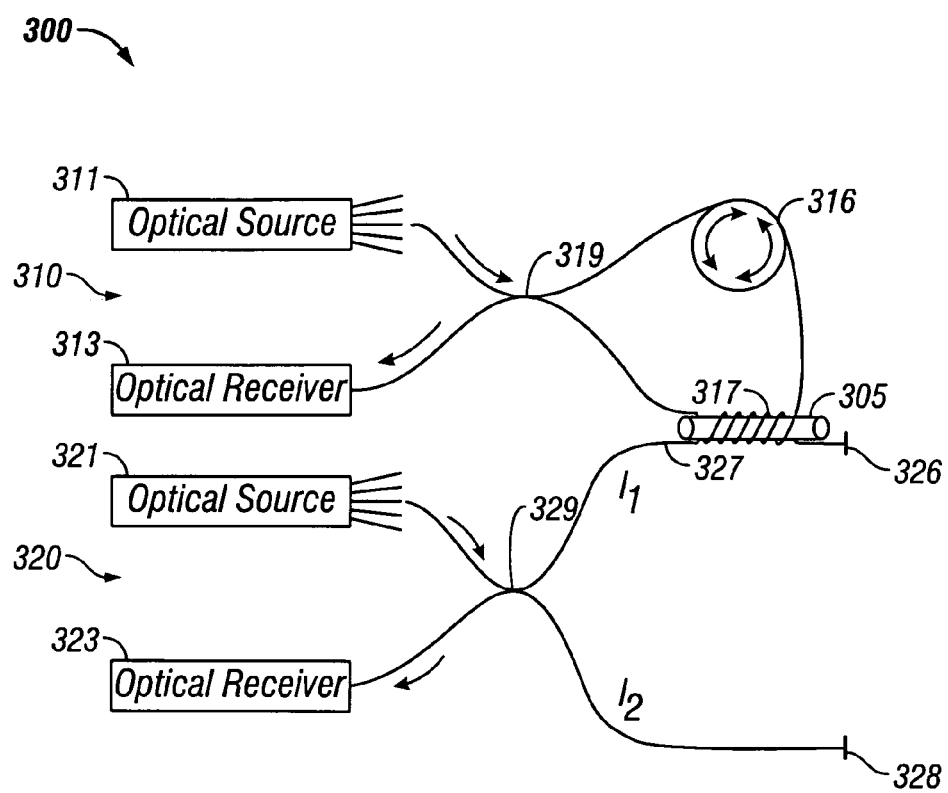
FIG. 3 shows a diagram of an example embodiment of a tool having a Sagnac interferometer and a Michelson interferometer to measure pressure in a conduit, according to various embodiments.

FIG. 3 shows a diagram of an example embodiment of an apparatus 300 having a Sagnac interferometer 310 and a Michelson interferometer 320 to measure pressure in a conduit 305, according to various embodiments. Conduit 305 may be a flow line pipe in a drilling operation. Sagnac interferometer 310 includes an optical source 311, an optical receiver 313, and a sensor coil 317. Sensor coil 317 can be a sensing portion realized as an optical fiber that is attachable to conduit 305 by winding the optical fiber around conduit 305. Light from optical source 311 is split by an optical splitter 319 to send a clockwise signal and a counter clockwise signal to a delay cell 316. Optical splitter 319 also couples light from sensor coil 317 to optical receiver 313.

Michelson interferometer 320 includes an optical source 321, an optical receiver 323, and a sensor coil 327. Sensor coil 327 can be a sensing portion realized as an optical fiber that is attachable to conduit 305 by winding the optical fiber around conduit 305. Sensor coil 327 of Michelson interferometer 320 can be collocated with sensor coil 317 of Sagnac interferometer 310, though Sagnac interferometer 310 and Michelson interferometer 320 are isolated. Light from optical source 321 is split by an optical splitter 329 to send an optical signal through sensor coil 327 to a mirror 326 over a length $l_1$. At mirror 326, the light is reflected to propagate back through sensor coil 327 to splitter 329, where the light is directed to optical receiver 323. Light split from optical splitter 329 is directed over a length $l_2$ to another mirror 328. At mirror 328, light is reflected back through to splitter 329, where the light is directed to optical receiver 323.

Michelson sensor (320) works by comparing a fiber optic sensing element that is sensitive to changes in the flow line (conduit 305) to a similar fiber optic element that is not affected by the flow line. Michelson sensor (320) can be configured to adjust the sensitivity of the Michelson portion of the combined Sagnac (310)/Michelson (320) sensor. The sensitivity of the Michelson portion depends on the length of the fiber that is wound around conduit 305. With increased length of the sensing element, there is increased sensitivity. While the sensitivity may be too low for some applications, it may also be too high for other applications. In the case of Michelson sensor (320), excessive sensitivity may occur when the rate of pressure change is of such a high level that oscillations occur so fast that the electronics implemented may be unable to count these oscillations accurately. In such a case, a shorter fiber in Michelson sensor (320) can be used, which would reduce the number of oscillations for a given pressure change. While a sensitive fiber element (317) of one length is used in the Sagnac portion of the combined Sagnac (310)/Michelson (320) sensor to attain a desirable Sagnac sensitivity, the sensitive fiber element (327) of the Michelson portion can use a different length to attain a desirable Michelson sensitivity.

Figure 4:
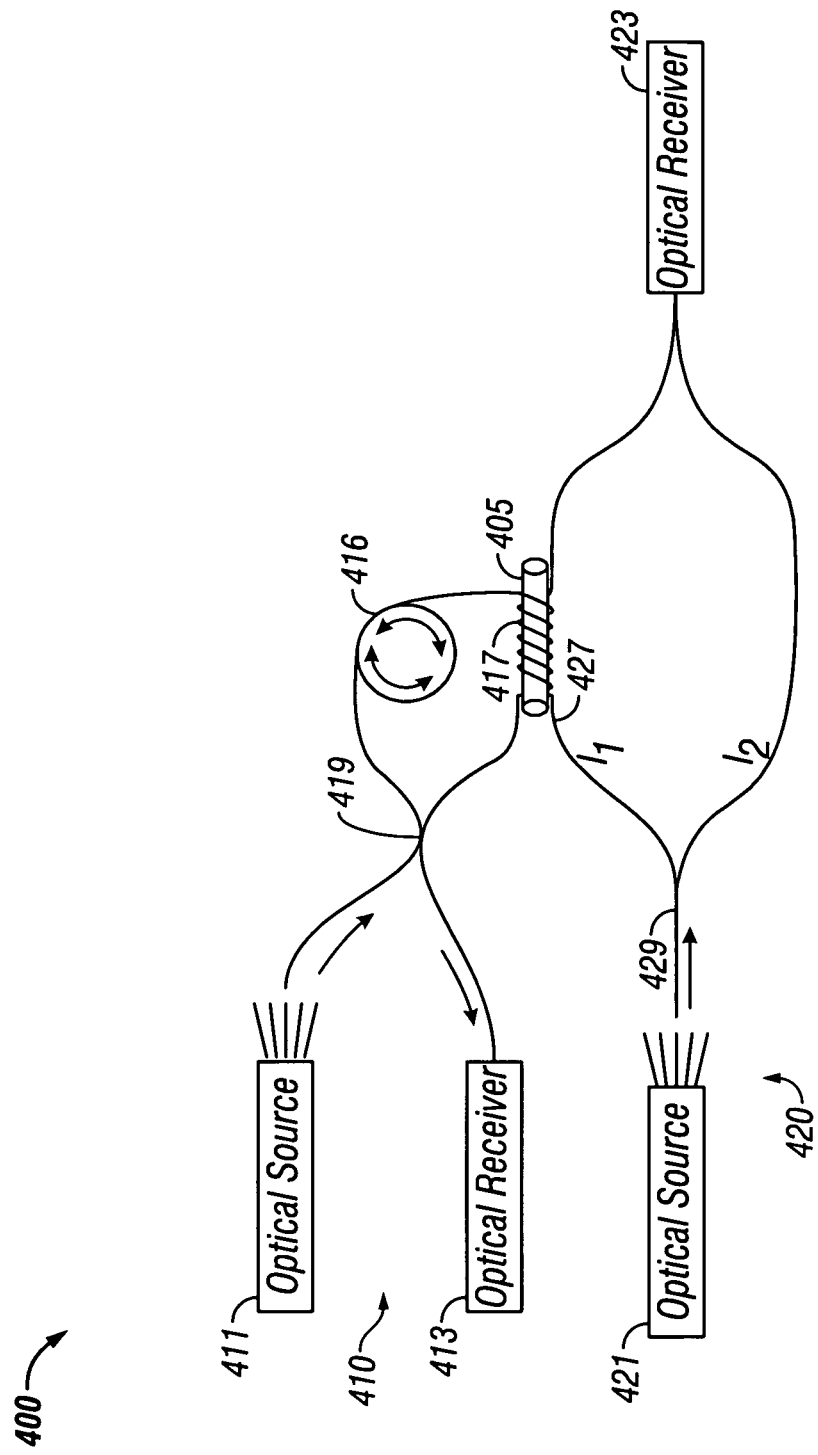
FIG. 4 shows a diagram of an example embodiment of a tool having a Sagnac interferometer and a Mach-Zehnder interferometer to measure pressure in a conduit, according to various embodiments.

FIG. 4 shows a diagram of an example embodiment of an apparatus 400 having a Sagnac interferometer 410 and a Mach-Zehnder interferometer 420 to measure pressure in a conduit 405, according to various embodiments. Conduit 405 may be a flow line pipe in a drilling operation. Sagnac interferometer 410 includes an optical source 411, an optical receiver 413, and a sensor coil 417. Sensor coil 417 can be a sensing portion realized as an optical fiber that is attachable to conduit 405 by winding the optical fiber around conduit 405. Light from optical source 411 is split by an optical splitter 419 to send a clockwise signal and a counter clockwise signal to a delay cell 416. Optical splitter 419 also couples light from sensor coil 417 to optical receiver 413.

Mach-Zehnder interferometer 420 includes an optical source 421, an optical receiver 423, and a sensor coil 427. Sensor coil 427 can be a sensing portion realized as an optical fiber that is attachable to conduit 405 by winding the optical fiber around conduit 405. Sensor coil 427 of Mach-Zehnder interferometer 420 can be collocated with sensor coil 417 of Sagnac interferometer 410, though Sagnac interferometer 310 and Mach-Zehnder interferometer 420 are isolated. Light from optical source 421 is split by an optical splitter 429 to send an optical signal through sensor coil 427 to optical receiver 423 over a length $l_1$. The other light signal split from optical splitter 429 is directed over a length $l_2$ to optical receiver 423.

Mach-Zehnder sensor (420) works by comparing a fiber optic sensing element that is sensitive to changes in the flow line (conduit 405) to a similar fiber optic element that is not affected by the flow line. Mach-Zehnder sensor (420) can be configured to adjust the sensitivity of the Mach-Zehnder portion of the combined Sagnac (410)/Mach-Zehnder (420) sensor. The sensitivity of the Mach-Zehnder portion depends on the length of the fiber that is wound around conduit 405. With increased length of the sensing element, there is increased sensitivity. While the sensitivity may be too low for some applications, it may also be too high for other applications. In the case of Mach-Zehnder sensor (420), excessive sensitivity may occur when the rate of pressure change is of such a high level that oscillations occur so fast that the electronics implemented may be unable to count these oscillations accurately. In such a case, a shorter fiber in Mach-Zehnder sensor (420) can be used, which would reduce the number of oscillations for a given pressure change. While a sensitive fiber element (417) of one length is used in the Sagnac portion of the combined Sagnac (410)/Mach-Zehnder (420) sensor to attain a desirable Sagnac sensitivity, the sensitive fiber element (427) of the Mach-Zehnder portion can use a different length to attain a desirable Mach-Zehnder sensitivity.

Figure 5:
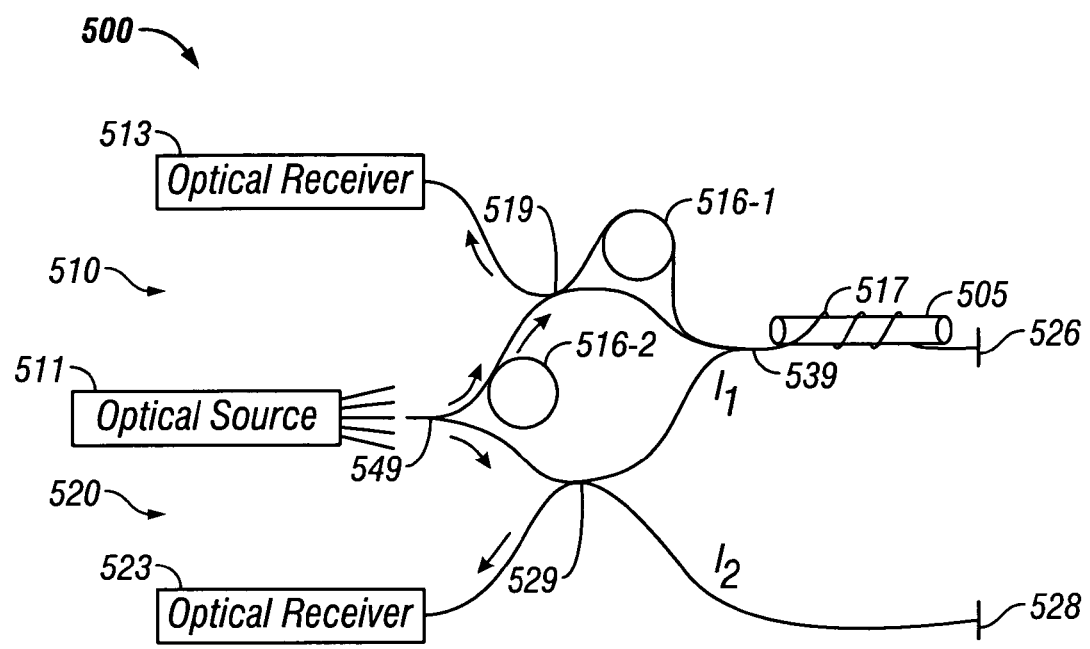
FIG. 5 shows a diagram of an example embodiment of a tool having a common optical source for both a Sagnac interferometer and a Michelson interferometer, according to various embodiments.

FIG. 5 shows a diagram of an example embodiment of an apparatus 500 having a common optical source 511 for both a Sagnac interferometer 510 and a Michelson interferometer 520, according to various embodiments. Sagnac interferometer 510 includes optical source 511, an optical receiver 513, and a sensor coil 517. Sensor coil 517 can be a sensing portion realized as an optical fiber that is attachable to conduit 505 by winding the optical fiber around conduit 505. Conduit 505 may be a flow line pipe in a drilling operation.

Light from optical source 511 is split by an optical splitter 549 for use by Sagnac interferometer 510 and for use by Michelson interferometer 520. Optical splitter 549 can be arranged to split the output from the optical source 511 such that one half of the light goes directly to Mach-Zehnder interferometer 520. The other half is directed to single reflecting Sagnac interferometer 510. Other ratios for splitting the light may be used, where these different ratios are taken into account in processing the signals from both interferometers. Light from optical splitter 549 for use by Sagnac interferometer 510 is directed to delay cell 516-2. Delay cell 516-2 is long enough to render the light, from delay cell 516-2, incoherent with the light from optical splitter 549 for Michelson interferometer 520. Light from delay cell 516-2 is directed to optical splitter 519 to send a clockwise signal and a counter clockwise signal to a delay cell 516-1 via sensor coil 517 and optical splitter 539. Optical splitter 519 also couples light from sensor coil 517 to optical receiver 513.

Michelson interferometer 520 includes optical source 511, an optical receiver 523, and a sensor coil 517. Optical source 511 of Michelson interferometer 520 is the same optical source as optical source 511 of Sagnac interferometer 510. Sensor coil 517 can be a sensing portion realized as an optical fiber that is attachable to conduit 505 by winding the optical fiber around conduit 505. Sensor coil 517 of Michelson interferometer 520 is the same sensor coil 517 of Sagnac interferometer 510.

Light from optical splitter 549 for use by Michelson interferometer 520 is then split by an optical splitter 529 to send an optical signal, via optical splitter 539, through sensor coil 517 to a mirror 526 over a length $l_1$. At mirror 526, the light is reflected to propagate back through sensor coil 517 to splitter 539, where the light is directed to optical receiver 523 via optical splitter 529. In addition, light split from optical splitter 529 is directed over a length $l_2$ to another mirror 528. At mirror 528, light is reflected back through to splitter 529, where the light is directed to optical receiver 523.

Figure 6:
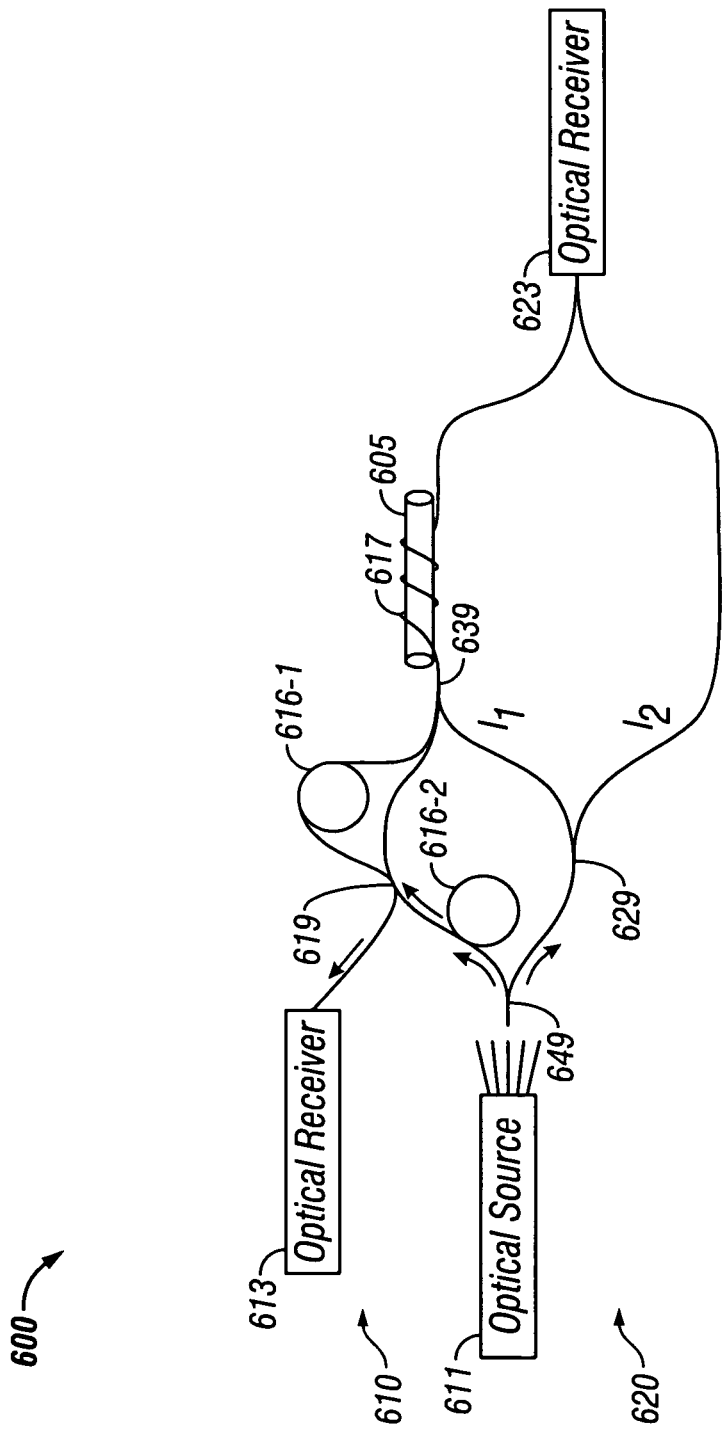
FIG. 6 shows a diagram of an example embodiment of a tool having a common optical source for both a Sagnac interferometer and a Mach-Zehnder interferometer, according to various embodiments.

FIG. 6 shows a diagram of an example embodiment of an apparatus 600 having a common optical source 611 for both a Sagnac interferometer 610 and a Mach-Zehnder interferometer 620, according to various embodiments. Sagnac interferometer 610 includes optical source 611, an optical receiver 613, and a sensor coil 617. Sensor coil 617 can be a sensing portion realized as an optical fiber that is attachable to conduit 605 by winding the optical fiber around conduit 605. Conduit 605 may be a flow line pipe in a drilling operation.

Light from optical source 611 is split by an optical splitter 649 for use by Sagnac interferometer 610 and for use by Mach-Zehnder interferometer 620. Optical splitter 649 can be arranged to split the output from the optical source 611 such that one half of the light goes directly to Mach-Zehnder interferometer 620. The other half is directed to single reflecting Sagnac interferometer 610. Other ratios for splitting the light may be used, where these different ratios are taken into account in processing the signals from both interferometers. Light from optical splitter 649 for use by Sagnac interferometer 610 is directed to delay cell 616-2. Delay cell 616-2 is long enough to render the light, from delay cell 616-2, incoherent with the light from optical splitter 649 for Mach-Zehnder interferometer 620. Light from delay cell 616-2 is directed to optical splitter 619 to send a clockwise signal and a counter clockwise signal to a delay cell 616-1 via sensor coil 617 and optical splitter 639. Optical splitter 619 also couples light from sensor coil 617 to optical receiver 613.

Mach-Zehnder interferometer 620 includes optical source 611, an optical receiver 623, and a sensor coil 617. Optical source 611 of Mach-Zehnder interferometer 620 is the same optical source as optical source 611 of Sagnac interferometer 610. Sensor coil 617 of Mach-Zehnder 620 is the same sensor coil 617 of Sagnac interferometer 610. Light from optical splitter 649 for use by Mach-Zehnder interferometer 620 is then split by an optical splitter 629 to send an optical signal, via optical splitter 639, through sensor coil 617 to optical receiver 623 over a length $l_1$. The other light signal split from optical splitter 629 is directed over a length $l_2$ to optical receiver 623.

In both a Michelson interferometer network and a Mach-Zehnder interferometer network, the amplitude of the recombined light is proportional to the difference in the lengths of the two paths, $l_1$ and $l_2$ shown in FIGS. 3-6. As the length of fiber wrapped around the pipe, conduits 305, 405, 505, and 605 of FIGS. 3-6, respectively, changes, the relative phase of the combined waves changes resulting in a changing amplitude of the light after recombination. The changes in the length of fiber wrapped around the pipe are related to the strain in the pipe due to the pressure in the pipe.

Figure 7:
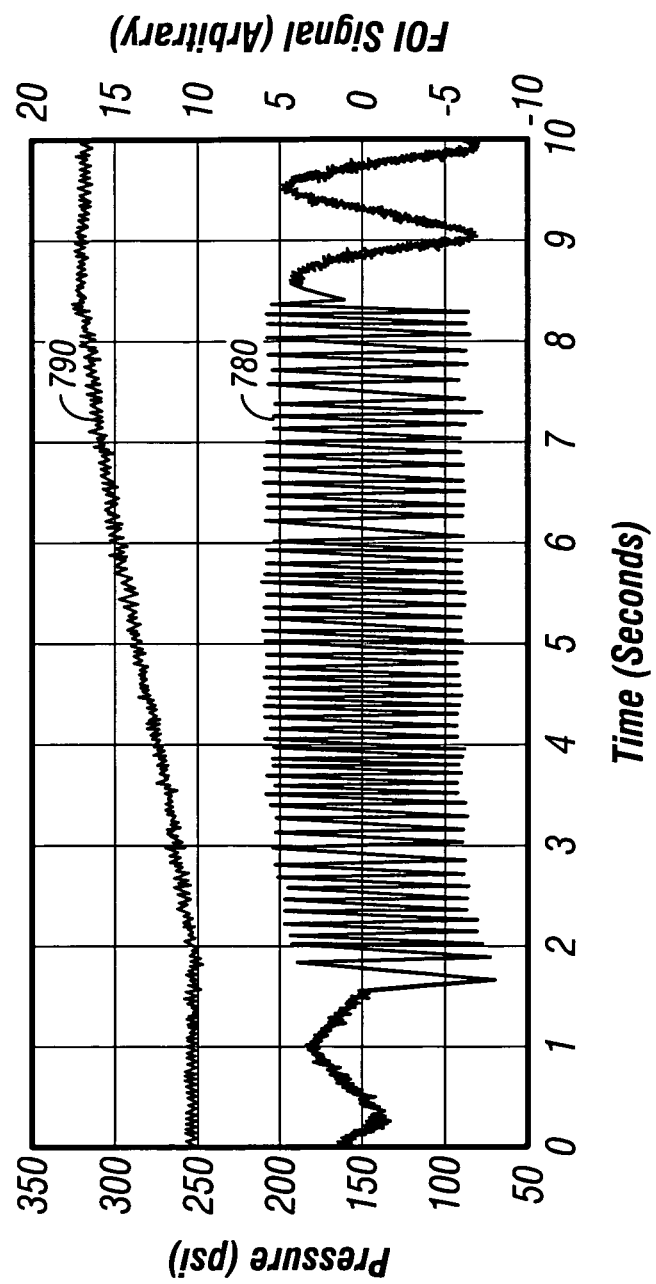
FIG. 7 shows results of a test of a Michelson interferometer similar to the Michelson interferometer in the tools of FIGS. 3 and 5, in accordance with various embodiments.

FIG. 7 shows results of a test of a Michelson interferometer similar to the Michelson interferometer in the apparatus of FIGS. 3 and 5, in accordance with various embodiments. Curve 790 shows a resulting amplitude with an independently determined pressure measurement, which is plotted simultaneously with the test measurement of a Michelson fiber optic sensor shown as curve 780. As the pressure changes from slow changes over time at the initial time (0 seconds) to slow changes over time above about 8 seconds as shown in the independently determined pressure measurement of curve, oscillations, or fringes, in the amplitude appear in curve 780 from the Michelson fiber optic sensor as the pressure changes. The slow changes over time at the initial time (0 seconds) and the slow changes over time above about 8 seconds appear to indicate almost constant pressure on curve 790, where the slow changes appear on curve 780 as slow oscillations corresponding to longer time periods.

Each successive fringe (oscillation) corresponds to the length of the fiber around the pipe changing by an amount equal to one wavelength of the light in the fiber. The wavelength in the fiber is the equal to the wavelength in a vacuum divided by the refractive index of the fiber. For the test shown in FIG. 7, this change in length corresponds to a distance of 1.31 microns. If the length of fiber is equal to the circumference of the pipe (for example, approximately 0.34 m), then one fringe, or oscillation, in the output corresponds to a change in circumference of 1.31 microns divided by two (0.65 microns). The dividing factor of two is used, because the light for measurement travels the length of the sensor twice, once to a mirror situated at the end of the sensing coil and once back from reflection from the mirror. In the test with results shown in FIG. 7, the length of the fiber was twenty times the pipe circumference; that is, there were 20 "turns" of the sensing coil around the pipe. Each oscillation, therefore, corresponds to a change in circumference of 0.65/20 microns or about 0.03 microns, corresponding to a sensitivity (neglecting noise considerations) of roughly $10^{-7}$.

The pressure changes within the pipe relative to a calibration point can be determined by counting fringes. What is not known by such counting, however, is the direction of the pressure change. Methods are available to detect the phase of the combined light and determine, thereby, the sense (direction as to whether it is increasing or decreasing) of the pressure change. However, the equipment for this purpose may be expensive, perhaps prohibitively so, for mud pulse telemetry applications. In various embodiments, the sense of the pressure change can be provided by a Sagnac interferometer combined with the Michelson or Mach-Zehnder interferometer in tool to provide a measurement of pressure.

The absolute pressure inside the pipe can be estimated using several techniques. In one approach, well known relations can be used that relate the strain in a cylinder, thin walled or thick walled, to the internal pressure. Such relations can be applied once two factors are known, the dimensions of the cylinder and the modulus of the material of which the cylinder is composed. Given these parameters of dimension and modulus, strain in the pipe, to which a tool similar or identical to one associated with any of FIGS. 1-6 can be attached, can be monitored by maintaining a running total of fringes for a Michelson or Mach-Zehnder interferometer. The internal pressure may then be continuously computed from the aforementioned relations.

In another approach for monitoring the absolute pressure in the pipe, a tool, similar or identical to one associated with any of FIGS. 1-6, can also include the maintenance of a running total of fringes, where an independent measure of pressure is used in conjunction with determining the running total of fringes. Such independent measures of pressure are typically available on a drilling rig for which pressure in a pipe is under measurement. Two values in the running total of fringes can be recorded that correspond to two known pressures, for example, zero fringes at ambient pressure and a known recorded number of fringes at a selected or known pressure within the pipe. In addition, a count of the number of fringes and corresponding pressures from using the independent pressure measurement can be recorded at convenient times during the drilling operation. A mathematical relationship of a physically reasonable behaviour between strain (fringe count) and internal pressure can be generated such that the pressure can be calibrated to fringe count. After the calibration, the independent measures of pressure are not made, since the pressure changes can be taken from the mathematical relationship generated in the calibration process. The mathematical relationship may be a linear relationship. This capability may allow for the avoidance of the installation of a pressure measurement transducer for the purpose of continuously logging the flow line pressure in a drilling operation.

In various embodiments, a Sagnac sensor, such as shown in the example tools of FIGS. 3-6, can be employed in order to determine the sense (positive or negative) of the pressure change indicated by the fringe count of a Michelson or a Mach-Zehnder system. The Sagnac approach may not provide a direct measurement of the pipe circumference, where measurement of changes in the pipe circumference can be correlated to pressure, but can provide a measure of the rate of change of the circumference, including the sign (+or −) of the change.

Figure 8:
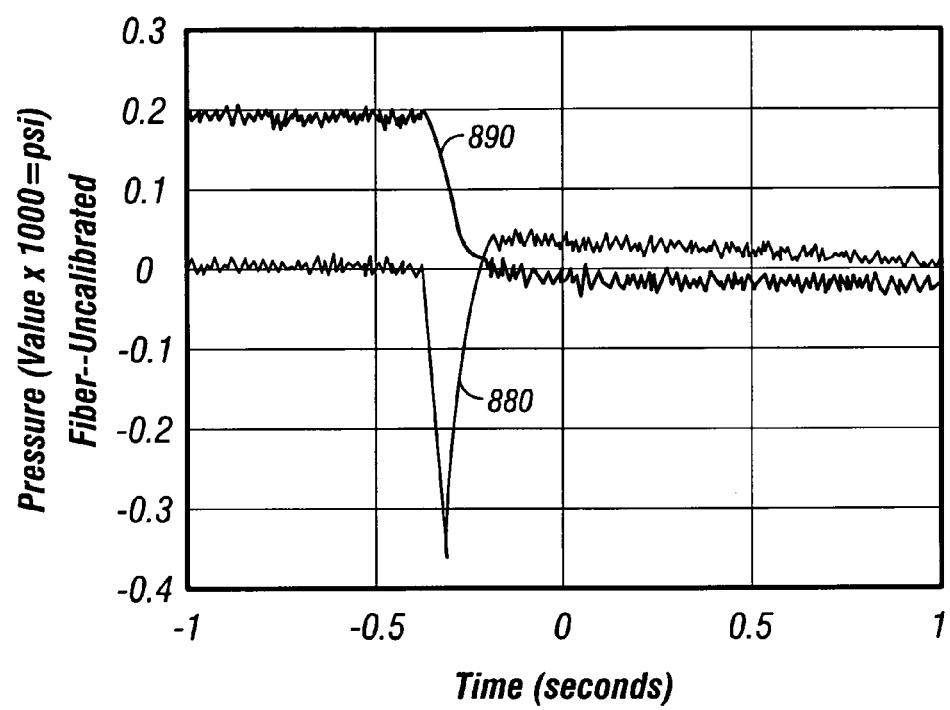
FIG. 8 shows results of a test of a Sagnac interferometer similar to the Sagnac interferometer in the tools of FIGS. 3-6, in accordance with various embodiments.

FIG. 8 shows results of a test of a Sagnac interferometer similar to the Sagnac interferometer in the tools of FIGS. 3-6, in accordance with various embodiments. Curve 890 shows pressure measured by an independent pressure measurement apparatus. Curve 880 shows a corresponding response from a Sagnac interferometer having a senor coil with 20 turns on a pipe being measured. Curve 890 indicates that the pipe has been subject to a change in pressure that includes a decrease in pressure. Curve 880 is an output of the Sagnac interferometer, showing a negative spike that indicates a negative change (decrease) in pressure. The output of the Sagnac is proportional to the time derivative of the pressure signal. Such an output signal can be integrated to produce a time series that can be proportional to the pressure variation as a function of time.

The Sagnac sensor allows telemetry signal detection to occur without drilling holes in the high pressure mud flow lines of a drilling operation. In addition, the Sagnac sensor or any number of Sagnac sensors can conveniently be placed essentially anywhere on the surface flow line, at least as compared to drilling more holes for additional traditional pressure sensors. Using any number of Sagnac sensors can provide an improved mechanism for detecting the leading and trailing edges of telemetry pulses in the flow line, as seen in the direct, un-integrated Sagnac output. Edge detection allows a doubling (approximately) of the data rate, with no increase in total pulses from downhole. Further, combining the signals from several Sagnac sensors, after delaying the signals by appropriate time intervals corresponding to the acoustic travel time in the drilling mud between the sensors, the signal to noise ratio can be significantly enhanced. Data from several Sagnac sensors can be combined to produce a magnified signal. Such an arrangement can also provide for a telemetry encoding scheme that depends on signal edge detection, rather than currently used schemes, which depend on detection of pressure pulses.

In some applications, a pressure per se is not measured, but only a signal that is proportional to the non-static component of the pressure. Static pressure can only be measured if the output is accurately integrated from ambient up to operating conditions. Although a Sagnac interferometric sensor can eliminate use of the pressure sensors currently used in telemetry systems of well operations, the logging units of conventional systems still may require a measurement of absolute pressure, which, currently, is obtained from the conventional sensors currently used for telemetry. Thus, a flow line invasive sensor would still be used for the conventional logging system enhanced with the Sagnac telemetry system. While a pressure-like signal may be obtained by integrating the Sagnac signal for the period of time corresponding to drilling a string of pipe, which may range from minutes to hours, there may be significant error build-up in the integrated Sagnac signal, if the measurement were made from the Sagnac sensor alone.

In various embodiments, a fiber optic Sagnac network can be installed with the sensor portion of the fiber optic Sagnac network at the same location as the sensor portion of a fiber optic Michelson network or a fiber optic Mach-Zehnder network. The design of the fiber optic sensor networks can be arranged such that both networks use the same fiber optic sensor coil. Using the fiber optic Sagnac network with a co-located sensor coil, the sign of pressure changes can be determined by the response of the fiber optic Sagnac system. The indication of the sign changes can then be combined with the fringe (oscillation) counts from the fiber optic Michelson and/or Mach-Zehnder system in an acquisition system to produce a pressure profile as a function of time. The structure of the acquisition system may depend on the application for which it is desired. For example, such an acquisition system can be structured for a well drilling operation in which the fiber optic sensor coil of the combined Sagnac/Michelson and/or Mach-Zehnder system is wound a number of times around a pipe of the drilling operation through which drilling fluids flow. The combined systems make available two redundant pressure related outputs: the numerically integrated output of the Sagnac system, which is proportional to the pressure, and the more accurate Michelson and/or Mach-Zehnder processed output incorporating the sign information of the Sagnac system. Operation of the combined systems to measure pressure in a flow line of a well drilling operation allows for a pressure measurement in which the flow line is not penetrated, which can provide for increased drilling rig safety, ease of installation, transparency to rig operation, and/or improvement of pressure detection. The combination of Sagnac and Michelson/Mach-Zehnder systems is not limited to the combined systems discussed with respect to any of FIGS. 1-8. Other structures implementing the combination of Sagnac and Michelson and/or Mach-Zehnder principles may be realized.

Figure 9:
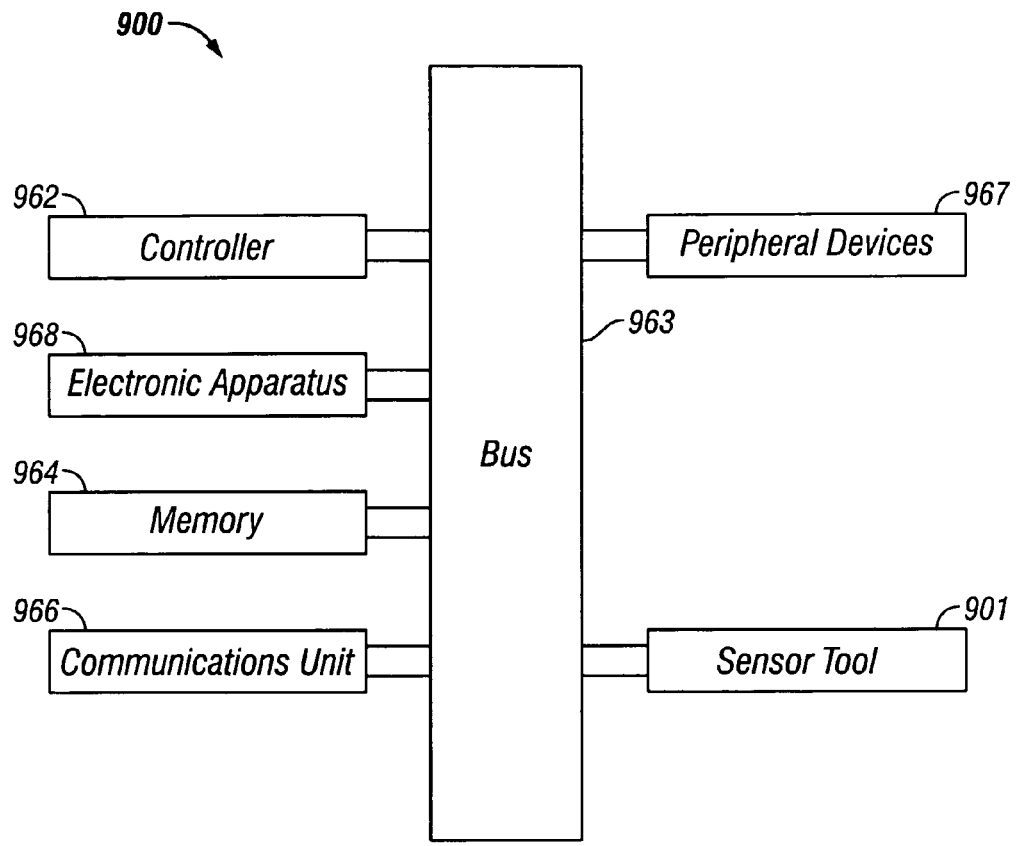
FIG. 9 depicts a block diagram of features of an embodiment of a system to process signals from a tool having a single path optical interferometer and a dual path optical interferometer such that the sensing portions of these interferometers are attachable at a colocation on a conduit, according to various embodiments.

FIG. 9 depicts a block diagram of features of an embodiment of a system 900 having a sensor tool 901. Sensor tool 901 includes a single path optical interferometer and a dual path optical interferometer to measure pressure in a conduit, where the single path optical interferometer and the dual path optical interferometer each have a sensing portion attachable to a location on conduit, such as conduit 105 of FIG. 1. The location can be a colocation. The conduit can be a flow line pipe in a well drilling operation. The single path optical interferometer and the dual path optical interferometer of sensor tool 901 can be arranged together to measure pressure within the conduit. The single path optical interferometer and the dual path optical interferometer can be arranged in a manner similar to or identical to interferometers associated with any of FIGS. 1-8.

System 900 can include controller 962, bus 963, memory 964, communications unit 966, peripheral devices 967, and electronic apparatus 968 to operate with sensor tool 901, control sensor tool 901, and/or provide analysis of data acquired using sensor tool 901. System 900 or portions of system 900 can be located on the surface to a well hole. Depending on the application, portions of system 900 can be located downhole in a well hole. System 900 can be arranged as a distributed system via bus 963. Bus 963 provides electrical conductivity among the components of system 900. Bus 963 can include an address bus, a data bus, and a control bus, each independently configured. Bus 963 can also use common conductive lines for providing one or more of address, data, or control, the use of which is regulated by controller 962. Bus 963 can be configured such that the components of system 900 are distributed.

Communications unit 966 can include downhole communications in a drilling operation. Such downhole communications can include a telemetry system. Such distribution can be arranged between downhole components for sensor tool 901, depending on the application of sensor tool 901. Various components of system 900 can be co-located such as on one or more collars of a drill string or on a wireline structure with communications unit providing data to surface component.

In various embodiments, peripheral devices 967 include displays, additional storage memory, and/or other control devices that may operate in conjunction with controller 962 and/or memory 964. In an embodiment, controller 962 is a processor. A peripheral device arranged as a display can be used with instructions stored in memory 964 to implement a user interface to manage the operation of sensor tool 901 and analysis of data or signals from sensor tool 901.

Memory 964 can be realized as a machine readable storage medium having instructions stored thereon, which, when executed by controller 962, cause system 900 to perform operations including controlling and/or analyzing data from sensor tool 901 in which sensing portions of the single path optical interferometer and the dual path optical interferometer of sensor tool 901 are attached and collocated on a conduit. The conduit can be a flow line pipe of a well drilling operation. The instructions can include instructions, which when executed by controller 962, cause system 900 to perform operations including: analyzing output from the optical receiver of the single path optical interferometer of sensor tool 901, providing a measure of a rate of pressure change within the conduit including direction of the pressure change; generating a count of signal oscillations in the output from the optical receiver of the dual path optical interferometer of sensor tool 901; and mapping the count of the signal oscillations to a magnitude of the pressure within the conduit. The instructions can also include instructions mapping the count of the signal oscillations to a magnitude of the pressure within the conduit using a strain relationship of the conduit. Other instructions include instructions to manage sensor tool 901, control sensor tool 901, and/or analyze data or signals from sensor tool 901 in accordance with performing operations on a combination of a single path optical interferometer and a dual path optical interferometer similar to or identical to any of the apparatus associated with FIGS. 1-8.

Figure 10:
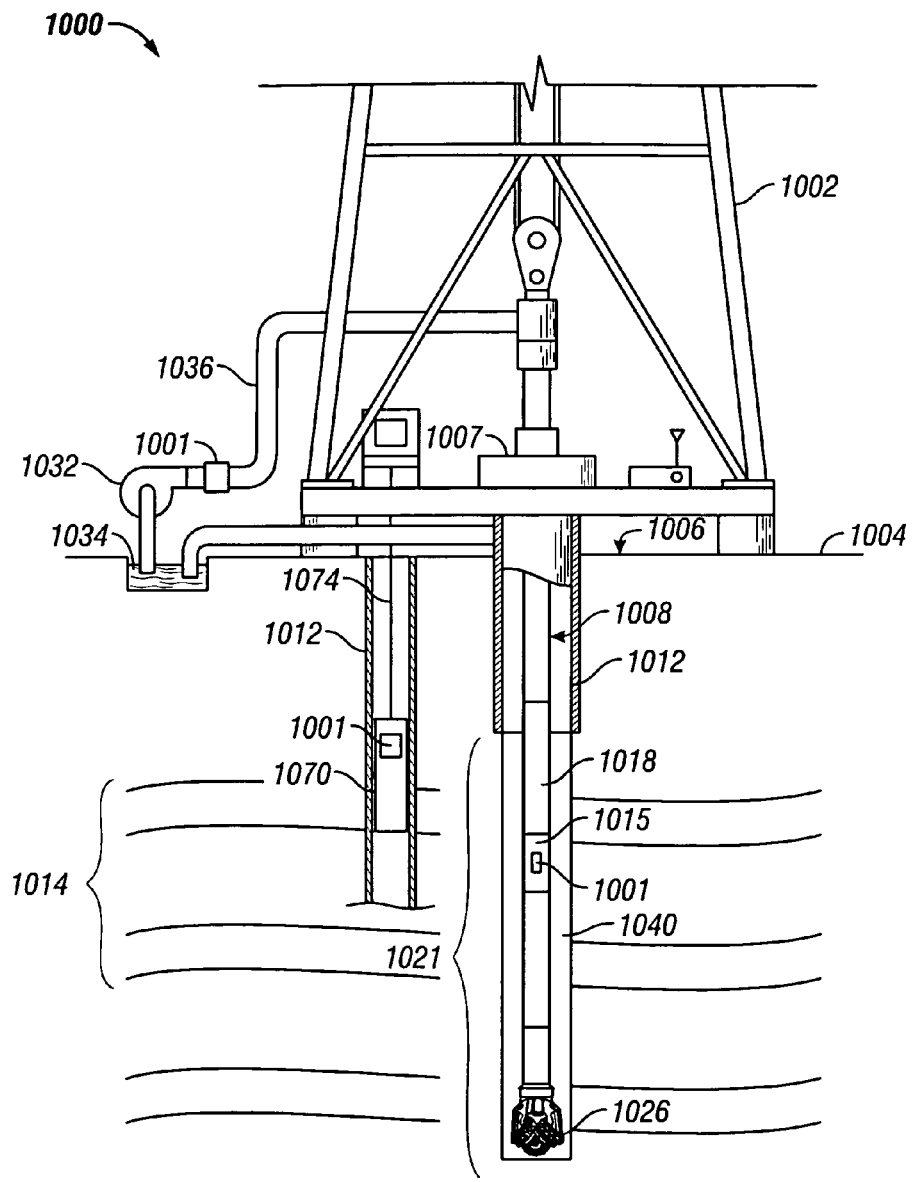
FIG. 10 depicts an embodiment of a system at a drilling site, according to various embodiments.

FIG. 10 depicts an embodiment of a system 1000 at a drilling site, where system 1000 includes a tool 1001 having a single path optical interferometer and a dual path optical interferometer such that the sensing portions of these interferometers are attached at a colocation on a conduit. Tool 1001 can be structured and fabricated to measure pressure in accordance with various embodiments as taught herein.

System 1000 can include a drilling rig 1002 located at a surface 1004 of a well 1006 and a string of drill pipes, that is, drill string 1008, connected together so as to form a drilling string that is lowered through a rotary table 1007 into a wellbore or borehole 1012. The drilling rig 1002 can provide support for drill string 1008. The drill string 1008 can operate to penetrate rotary table 1007 for drilling a borehole 1012 through subsurface formations 1014. The drill string 1008 can include drill pipe 1018 and a bottom hole assembly 1021 located at the lower portion of the drill pipe 1018. The bottom hole assembly 1021 can include drill collar 1015, tool 1001 and a drill bit 1026. The drill bit 1026 can operate to create a borehole 1012 by penetrating the surface 1004 and subsurface formations 1014.

During drilling operations, the drill string 1008 can be rotated by the rotary table 1007. In addition to, or alternatively, the bottom hole assembly 1021 can also be rotated by a motor (e.g., a mud motor) that is located downhole. The drill collars 1015 can be used to add weight to the drill bit 1026. The drill collars 1015 also can stiffen the bottom hole assembly 1021 to allow the bottom hole assembly 1021 to transfer the added weight to the drill bit 1026, and in turn, assist the drill bit 1026 in penetrating the surface 1004 and subsurface formations 1014.

During drilling operations, a mud pump 1032 can pump drilling fluid (sometimes known by those of skill in the art as "drilling mud") from a mud pit 1034 through a hose pipe 1036 into the drill pipe 1018 and down to the drill bit 1026. Tool 1001 can be attached to the pipe between mud pump 1032 and rotary table 1007. The drilling fluid can flow out from the drill bit 1026 and be returned to the surface 1004 through an annular area 1040 between the drill pipe 1018 and the sides of the borehole 1012. The drilling fluid may then be returned to the mud pit 1034, where such fluid is filtered. In some embodiments, the drilling fluid can be used to cool the drill bit 1026, as well as to provide lubrication for the drill bit 1026 during drilling operations. Additionally, the drilling fluid may be used to remove subsurface formation 1014 cuttings created by operating the drill bit 1026.

Tool 1001, attached to drill collar 1015, can be structured for an implementation in the borehole of a well as a measurements-while-drilling (MWD) system such as a logging-while-drilling (LWD) system. The housing containing tool 1001 can include flow control components, such as a pump, to inject fluid into a conduit in the housing such that tool 1001 can measure pressure associated with the housing in relation to other measurements being made using the housing. The housing containing tool 1001 can include electronics to activate a source of tool 1001 and collect responses from a sensor of tool 1001. Such electronics can include a processing unit to analyze signals sensed by tool 1001 and provide measurement results to the surface over a standard communication mechanism for operating a well. Alternatively, electronics can include a communications interface to provide signals sensed by tool 1001 to the surface over a standard communication mechanism for operating a well, where these sensed signals can be analyzed at a processing unit at the surface.

In various embodiments, tool 1001 may be included in a tool body 1070 coupled to a logging cable 1074 such as, for example, for wireline applications. Tool body 1070 housing tool 1001 can include flow control components, such as a pump, to inject fluid into a conduit in tool body 1070 such that tool 1001 can measure pressure associated with tool body 1070 in relation to other measurements being made using tool body 1070. Tool body 1070 containing tool 1001 can include electronics to activate sensor of tool 1001 and collect responses from a sensor of tool 1001. Such electronics can include a processing unit to analyze signals sensed by tool 1001 and provide measurement results to the surface over a standard communication mechanism for operating a well. Alternatively, electronics can include a communications interface to provide signals sensed by tool 1001 to the surface over a standard communication mechanism for operating a well, where these collected sensed signals are analyzed at a processing unit at the surface. Logging cable 1074 may be realized as a wireline (multiple power and communication lines), a mono-cable (a single conductor), and/or a slick-line (no conductors for power or communications), a structure including a fiber optic line, or other appropriate structure for use in bore hole 1012.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. An apparatus comprising:
a single path optical interferometer having a first sensing portion attachable to a location on a conduit;
a dual path optical interferometer having a second sensing portion attachable to the conduit adjacent the first sensing portion on the conduit, the single path optical interferometer and the dual path optical interferometer arranged together to measure pressure within the conduit at the location,
wherein the single path optical interferometer is arranged to measure a direction of pressure change within the conduit and the dual path optical interferometer is arranged to measure an amount of the pressure change within the conduit, with the measurement of the pressure in the conduit being based on a calibration point pressure, the direction of the pressure change, and a fringe count produced by the dual path interferometer, wherein the fringe count is correlated to a change in pressure by a calibration factor; and
one or more processors which, when instructions are executed by the one or more processors, analyzes an output from the single path interferometer, provides a measure of the direction of the pressure change, generates the fringe count that includes a count of signal oscillations from the dual path interferometer, and maps the fringe count, via the calibration factor, to the amount of the pressure change.

2. The apparatus of claim 1, wherein the single path optical interferometer includes a Sagnac interferometer to measure the direction of the pressure change within the conduit.

3. The apparatus of claim 2, wherein the dual path optical interferometer includes a Michelson interferometer to measure the amount of the pressure change within the conduit.

4. The apparatus of claim 2, wherein the dual path optical interferometer includes a Mach-Zehnder interferometer to measure the amount of the pressure change within the conduit.

5. The apparatus of claim 2, wherein the Sagnac interferometer has a first optical source and the dual path optical interferometer has a second optical source.

6. The apparatus of claim 2, wherein the Sagnac interferometer and the dual path optical interferometer have a common optical source.

7. The apparatus of claim 2, wherein the first sensing portion and the second sensing portion are a common sensing portion.

8. The apparatus of claim 7, wherein the common sensing portion includes an optical fiber wound around the conduit.

9. The apparatus of claim 1, wherein the dual path optical interferometer has a comparison optical element not affected by changes in the conduit.

10. A method comprising:
attaching a first sensing portion of a single path optical interferometer to a location on a conduit;
attaching a second sensing portion of a dual path optical interferometer adjacent the first sensing portion on the conduit;
activating a first optical source and injecting light into the single path optical interferometer having the first sensing portion and a first optical receiver;
activating a second optical source and injecting light into the dual path optical interferometer having the second sensing portion and a second optical receiver;
determining a calibration point that represents pressure in the conduit at the location prior to the pressure in the conduit changing;
measuring a known pressure change in the conduit;
determining a first fringe count output from the second optical receiver in response to the known pressure change;
determining a calibration factor by correlating the known pressure change to the first fringe count;
analyzing output from the first optical receiver correlated to the light injected into the single path optical interferometer, thereby determining a direction of an unknown pressure change in the conduit;
analyzing output from the second optical receiver correlated to the light injected into the dual path optical interferometer, thereby determining a second fringe count output from the second optical receiver in response to the unknown pressure change; and
after the unknown pressure change, determining the pressure in the conduit at the location based on the calibration point, the direction of the unknown pressure change, and applying the calibration factor to the second fringe count.

11. The method of claim 10, wherein analyzing the output from the first optical receiver includes measuring a rate of the pressure change within the conduit including a sign of the pressure change from a Sagnac interferometer arranged as the single path optical interferometer.

12. The method of claim 11, wherein analyzing the output from the second optical receiver includes determining the second fringe count by counting signal oscillations in the output from an optical receiver of either a Michelson interferometer or a Mach-Zehnder interferometer arranged as the dual path optical interferometer.

13. The method of claim 12, wherein determining pressure within the conduit includes mapping the second fringe count to magnitude of the pressure within the conduit using a strain relationship of the conduit.

14. The method of claim 10, wherein the conduit is a pipe located at a surface location of a well drilling operation in which fluid of the drilling operation flows through the pipe.

15. The method of claim 10, wherein the first and second optical sources are provided by a common optical source.

16. The method of claim 10, wherein the first sensing portion and the second sensing portion are a common sensing portion.

17. A system comprising:
a single path optical interferometer having a first sensing portion attachable to a location on a conduit;
a dual path optical interferometer having a second sensing portion attachable to the conduit adjacent the first sensing portion on the conduit; and
an analysis unit coupled to the single path optical interferometer and the dual path optical interferometer arranged together to measure pressure within the conduit at the location including direction of pressure change within the conduit, wherein the single path optical interferometer is arranged to measure the direction of pressure change within the conduit as a function of time and the dual path optical interferometer is arranged to measure an amount of the pressure change within the conduit, with the measurement of the pressure in the conduit being based on a calibration point pressure, the direction of the pressure change, and a fringe count produced by the dual path interferometer, wherein the fringe count is correlated to the pressure change by a calibration factor.

18. The system of claim 17, wherein single path optical interferometer includes a Sagnac interferometer.

19. The system of claim 18, wherein dual path optical interferometer includes a Michelson interferometer or a Mach-Zehnder interferometer.

20. The system of claim 18, wherein the analysis unit includes a nontransitory machine-readable storage medium operably coupled to a processor, the machine readable storage medium having instructions stored thereon such that the instructions, when executed by the processor, cause the system to perform operations comprising:
analyzing output from an optical receiver of the single path optical interferometer, providing a measure of a rate of the pressure change within the conduit including the direction of the pressure change;
generating the fringe count by counting signal oscillations in the output from an optical receiver of the dual path optical interferometer; and
correlating the fringe count to a magnitude of the pressure within the conduit.

21. The system of claim 20, wherein the instructions include correlating the fringe count to a magnitude of the pressure within the conduit using a strain relationship of the conduit.

* * * * *